(12) United States Patent
Cohen et al.

(10) Patent No.: US 11,370,115 B2
(45) Date of Patent: Jun. 28, 2022

(54) PATH PLANNING FOR AN UNMANNED VEHICLE

(71) Applicant: ELTA SYSTEMS LTD., Ashdod (IL)

(72) Inventors: Ofir Cohen, Tzelafon (IL); Dina Appelman, Bat-Yam (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 16/753,909

(22) PCT Filed: Oct. 15, 2018

(86) PCT No.: PCT/IL2018/051104
§ 371 (c)(1),
(2) Date: Apr. 6, 2020

(87) PCT Pub. No.: WO2019/077600
PCT Pub. Date: Apr. 25, 2019

(65) Prior Publication Data
US 2020/0391384 A1    Dec. 17, 2020

(30) Foreign Application Priority Data

Oct. 16, 2017    (IL) .......................................... 255050

(51) Int. Cl.
| | | |
|---|---|---|
| *G05D 1/00* | (2006.01) | |
| *B25J 9/16* | (2006.01) | |
| *B25J 13/08* | (2006.01) | |
| *G05D 1/02* | (2020.01) | |
| *G05D 1/08* | (2006.01) | |

(52) U.S. Cl.
CPC .......... *B25J 9/1666* (2013.01); *B25J 13/089* (2013.01); *G05D 1/0274* (2013.01); *G05D 1/08* (2013.01); *G05D 2201/0207* (2013.01)

(58) Field of Classification Search
CPC .................. B25J 9/1666; B25J 13/089; G05D 2201/0207; G05D 1/08; G05D 1/0274
USPC .......... 701/23, 301, 408, 411, 532; 340/436, 340/903
See application file for complete search history.

(56) References Cited

U.S. PATENT DOCUMENTS

| | | | |
|---|---|---|---|
| 5,281,901 A * | 1/1994 | Yardley | G05D 1/0265 318/587 |
| 6,259,988 B1 | 7/2001 | Galkowski et al. | |
| 6,314,369 B1 | 11/2001 | Ito et al. | |
| 6,363,632 B1 * | 4/2002 | Stentz | E02F 3/437 37/414 |
| 7,272,474 B1 | 9/2007 | Stentz et al. | |

(Continued)

FOREIGN PATENT DOCUMENTS

| | | |
|---|---|---|
| WO | 2006082136 A1 | 8/2006 |
| WO | 2014068975 A1 | 5/2014 |

(Continued)

*Primary Examiner* — Dalena Tran
(74) *Attorney, Agent, or Firm* — Dorsey & Whitney LLP

(57) ABSTRACT

Thus, according to some examples of the presently disclosed subject matter, in order to reduce path planning time, information that has previously been calculated during planning of a path is reused during planning of other subsequent paths. Using the stored indication reduces time required for planning the path and thus enables to evaluate a greater number of optional paths within a given period of time. This can assist in increasing speed and smoothness of vehicle maneuverability.

24 Claims, 6 Drawing Sheets

(56) References Cited

U.S. PATENT DOCUMENTS

| | | | |
|---|---|---|---|
| 8,050,863 B2 | 11/2011 | Trepagnier et al. | |
| 8,983,707 B2 * | 3/2015 | Everett | G05D 1/0291 |
| | | | 701/24 |
| 8,983,738 B2 * | 3/2015 | Avitzur | E02F 9/205 |
| | | | 701/50 |
| 10,228,691 B1 * | 3/2019 | Pounds | G01S 7/24 |
| 2008/0059015 A1 | 3/2008 | Whittaker et al. | |
| 2010/0026555 A1 | 2/2010 | Whittaker et al. | |
| 2011/0015816 A1 | 1/2011 | Dow et al. | |
| 2015/0234383 A1 | 8/2015 | Tanigawa et al. | |

FOREIGN PATENT DOCUMENTS

| | | |
|---|---|---|
| WO | 2017079321 A1 | 5/2017 |
| WO | 2018154579 A1 | 8/2018 |

\* cited by examiner

| X | Y | ANG. | CONSI DERED | LOCATION POSSIBLE | INCLINE POSSIBLE | PROXIMITY WEIGHT | INCLINE WEIGHT | PERMITTED AREA WEIGHT |
|---|---|---|---|---|---|---|---|---|
| 1 | 1 | 1 | + | + | - | | | |
| 1 | 1 | 2 | - | | | | | |
| 1 | 1 | 3 | + | + | + | 30 | 40 | 25 |
| 1 | 2 | 1 | + | + | + | 5 | 10 | 12 |

| X | Y | ANG. | LOCATION POSSIBLE | INCLINE POSSIBLE | PROXIMITY WEIGHT | INCLINE WEIGHT | ALLOWED AREA WEIGHT |
|---|---|---|---|---|---|---|---|
| 1 | 1 | 1 | + | - | | | |

412 → 2

| X | Y | ANG. | LOCATION POSSIBLE | INCLINE POSSIBLE | PROXIMITY WEIGHT | INCLINE WEIGHT | ALLOWED AREA WEIGHT |
|---|---|---|---|---|---|---|---|
| 1 | 1 | 2 | - | - | | | |

416 → 3

| X | Y | ANG. | LOCATION POSSIBLE | INCLINE POSSIBLE | PROXIMITY WEIGHT | INCLINE WEIGHT | ALLOWED AREA WEIGHT |
|---|---|---|---|---|---|---|---|
| 1 | 1 | 3 | + | + | 30 | 40 | 25 |

420 → 4

| X | Y | ANG. | LOCATION POSSIBLE | INCLINE POSSIBLE | PROXIMITY WEIGHT | INCLINE WEIGHT | ALLOWED AREA WEIGHT |
|---|---|---|---|---|---|---|---|
| 1 | 2 | 1 | + | + | 5 | 10 | 12 |

FIG. 4B

PATH PLANNING FOR AN UNMANNED VEHICLE

TECHNICAL FIELD

The presently disclosed subject matter relates to autonomous path planning.

BACKGROUND

An unmanned vehicle (UV), also referred to as an uncrewed vehicle or an autonomous vehicle (AV), includes a motorized machine that travels by integrating sensory data with computer-based decision making for the purpose of autonomously controlling the vehicle. A UV can be used for commuting people as well as various other tasks, such as operating within areas which are dangerous or not possible for humans to enter e.g. for bringing supplies or machinery, performing dangerous missions, or the like.

One issue, related to the operation of unmanned vehicles, has to do with the autonomous planning of a path from a starting point, such as a current location of the UV, to a certain destination, in particular when the area to be traversed comprises unpassable obstacles or problematic areas which should be avoided.

GENERAL DESCRIPTION

The disclosure herein relates to the autonomous and efficient planning of a path for a UV, and to steering the UV in accordance with the path. The path is planned in accordance with a map of the area that is being traversed.

In some applications, such as when planning a path for a UV, the map can be generated based on data obtained by one or more sensors mounted on the UV, and can represent a region surrounding the UV. The map can thus be updated as the UV advances and new data becomes available. Since the UV is often in continuous movement during path planning, the path needs to be planned in real-time or near-real-time to avoid collision with obstacles, delays in the progress of the vehicle, and other problems, which may result from advancement of the UV in accordance with an outdated map.

According to some examples of the presently disclosed subject matter, planning a path comprises determining or receiving a starting point and a destination point. A multiplicity of paths can then be planned, leading the vehicle from its current position in a desired direction (e.g. of the destination), and a most suitable path can be selected from the suggested paths. A suitable path can be a path that reaches or advances towards the destination and in some examples also complies with requirements such as requirements related to the arrival time or to the path length, avoids forbidden areas or positions, and reduces undesired situations such as steep slopes, prohibited areas, or the like.

One issue related to autonomous path planning is that in order to avoid collision with obstacles, delays in the progress of the vehicle, or other problems resulting from advancement of the UV in accordance with an outdated map, the path has to be planned in real-time or near-real-time, once an updated map of the traversed area is available.

Thus, the path has to be planned in short time frames. Enhancing the path planning efficiency can help in attaining a larger number of optional paths in a predetermined time frame, (e.g., 0.05 sec., 0.1 sec., 0.5 sec, 1 sec, or the like), thus increasing the probability that suitable paths would be available to select from.

Thus, according to the presently disclosed subject matter, in order to reduce path planning time, information that has previously been calculated during planning of a path is reused during planning of other subsequent paths.

According to some examples, a vehicle-state evaluation process is executed. The term "vehicle-state" as used herein refers to a vehicle's (e.g. unmanned ground vehicle—UGV) positioning parameters including a specific location (position) and heading of the vehicle. During the vehicle-state evaluation process it is determined whether certain vehicle-states are feasible or not, including whether or not a vehicle can be positioned at a certain vehicle-state. The vehicle-state can be considered feasible if certain conditions are met. For example, one condition may require that the vehicle would not collide with an obstacle when in the vehicle-state, and another condition may require that the roll and pitch angles of the vehicle in the vehicle-state comply with some pre-defined criteria (e.g. are within some predefined threshold values). If the vehicle-state is feasible, additional parameters can be used for assessing favorability of the vehicle-state over other vehicle-states. Favorability of a vehicle-state can be expressed in weights and can be based on parameters such as: proximity of the vehicle to nearby obstacles, pitch and roll angles assumed by the vehicle, whether the vehicle is positioned in an undesired or restricted area, or the like. Following evaluation of a vehicle-state, one or more weights can be associated with the vehicle-state, indicating the favorability of the vehicle-state.

It will be appreciated that when planning different paths, some segments of different paths may overlap, thus the same vehicle-state can be assumed in such segments of different paths. Accordingly, the above vehicle-state data, including whether the vehicle-state is feasible or not, and the assigned weights, if any, after being evaluated for a particular vehicle-state, can be stored for future retrieval, thereby saving valuable computation time, and optionally other computer resources such as processing power. Future retrieval of vehicle-state data may be exercised when calculating further paths associated with the same map, from which a suitable path has to be selected. Alternatively, future retrieval may be executed during future planning, for example when planning additional paths based on the same map update, or when planning paths at a later time after one or more further map updates are received.

Thus, re-usage of vehicle-state data (herein below "re-usage") can contribute to shortening of the processing time required during path planning, and accordingly can further assist in increasing the number of paths which can be calculated and evaluated during a period of time allotted for planning a path. Therefore re-usage can increase the probability of finding a more suitable path, thereby improving vehicle navigation, as opposed to re-usage not being exercised. Re-usage can be implemented when two or more paths comprise at least one overlapping segment.

Once a suitable path has been selected, steering instructions can be determined and the vehicle can be steered in accordance with the selected path.

Thus, an aspect of the disclosed subject matter relates to a method of path planning for an unmanned vehicle (UV) executed in real-time while traversing an area, the method comprising: operating a scanning device for executing scanning operations, that include scanning a region within the area, to thereby generate respective scanning output data;

operating at least one processing unit for:

obtaining a map generated based on the scanning output data, the map representing at least a part of the region and is divided into cells, each cell in the map is classified to a class selected from two or more classes, comprising traversable and non-traversable; based on the map, planning one or more paths for the UV, the planning comprising: upon determining that within a path of the one or more paths the UV is to assume a vehicle-state: querying a data structure configured to store data related to vehicle states, each vehicle-state being characterized by at least a respective position and heading of the UV and is indicative of whether or not the vehicle-state is feasible for the UV; if the data structure comprises an indication corresponding to the vehicle-state, using data stored in association with the vehicle-state for planning the path, otherwise computing and storing the data associated with the vehicle-state; and selecting a path from the one or more paths.

Using the stored indication data reduces time required for planning the path and thus enables to evaluate a greater number of optional paths within a given period of time. This can assist in increasing speed and smoothness of vehicle maneuverability.

In addition to the above features, the method of this aspect of the presently disclosed subject matter can optionally comprise one or more of features (i) to (xvii) listed below, in any technically possible combination or permutation:

i. Wherein the data structure comprises one or more entries, each entry representing a respective vehicle-state and comprises an indication as to whether the respective vehicle-state is feasible or not.

ii. Wherein an entry of the one or more entries further comprises a weight indicating proximity of the UGV to an obstacle when the UGV assumes the vehicle-state.

iii. Wherein feasibility of the vehicle-state requires that position of the UV in the vehicle-state is not mapped to non-traversable cells.

iv. Wherein an entry of the one or more entries further comprises a weight indicating an incline of the UGV, when the UGV assumes the vehicle-state.

v. Wherein an entry of the one or more entries further comprises a weight indicating the UGV presence at an undesired location, when the UGV assumes the vehicle-state.

vi. Wherein entries are maintained for further maps generated upon receiving further scanning output data.

vii. Wherein the planning of the one or more paths includes planning two or more paths.

viii. The method further comprises steering the UV in accordance with the path that has been selected.

ix. Wherein the steering is executed autonomously by the vehicle.

x. Wherein feasibility of the vehicle-state requires that one or more of yaw, pitch and roll angles of the UV comply with one or more predefined criteria.

xi. The method further comprises operating the processing unit for generating the map.

xii. Wherein the unmanned vehicle is a unmanned ground vehicle (UGV).

xiii. Wherein the unamend vehicle is a unmanned aerial vehicle.

xiv. Wherein the unmanned vehicle is a unmanned marine vehicle.

xv. The method further comprises receiving data indicative of a destination of the UV, and wherein the one or more paths are determined from the current position of the UV to the destination.

xvi. The method further comprises as the UV advances within the area and new scanning output data of new regions within the area is generated, obtaining an updated map generated and based on the new scanning output data and repeating the planning based on the updated map.

xvii. The method further comprises as the UV advances within the area and new scanning output data of new regions within the area is generated:

excluding old regions from the map; and deleting from the data structure vehicle-states that correspond to the old regions.

According to another aspect of the presently disclosed subject matter there is provided a system mountable on a vehicle, the system comprising a processing unit and at least one scanning device, the system being configured to:

operate the at least one scanning device for executing scanning operations that include scanning a region within an area being traversed by the UV, to thereby generate respective scanning output data;

operate the processing unit for:

obtaining a map based on the scanning output data, the map representing at least a part of the region, the map is divided into cells where each cell is classified to a class selected from two or more classes, comprising traversable and non-traversable; and, based on the map, planning two or more paths for the UV, the planning comprises: upon determining that within a path of the two or more paths the UV is to assume a certain vehicle-state within the one or more paths: querying a data structure, stored in a computer storage device operatively connected to the processing unit, configured to maintain one or more entries, each of the entries indicating whether a respective vehicle-state is feasible for the UV, the vehicle-state being associated with at least a respective position and heading of the UV; if the data structure comprises an indication corresponding to the vehicle-state, using data stored in association with the vehicle-state for planning the path, otherwise computing and storing the data associated with the vehicle-state; and selecting a path from the two or more paths.

According to another aspect of the presently disclosed subject matter there is provided a system mountable on an unmanned vehicle (UV), the system comprising a processing unit configured to:

receive scanning output data, the scanning output data is a product of scanning operations that are executed by a scanning device and include scanning a region within an area being traversed by the UV;

generate a map based on the scanning output data, the map representing at least a part of the region, and is divided into cells, each cell being classified to a class selected from two or more classes, comprising: traversable and non-traversable; and, based on the map, planning two or more paths for the UV, the planning comprising:

upon determining that within a path of the two or more paths, the UV is to assume a certain vehicle-state: query a data structure, stored in a computer storage device operatively connected to the processing unit, configured to keep one or more entries, each of the entries indicating whether a respective vehicle-state is feasible for the UV, the vehicle-state being associated with at least a respective position and heading of the UV; if the data structure comprises an indication corresponding to the vehicle-state, use data stored in association with the vehicle-state for planning the path, otherwise compute and store the data associated with the vehicle-state; and select a path from the two or more paths.

The system disclosed in accordance with the aspects of the presently disclosed subject matter detailed above can optionally comprise one or more of features (i) to (xvii) listed above, mutatis mutandis, in any technically possible combination or permutation.

According to another aspect of the presently disclosed subject matter there is provided an unmanned vehicle (UV), comprising: a scanning device and a processing unit; the scanning device is configured and operable to scan a region surrounding the UV within an area traversed by the UV, to thereby provide scanning output data providing information about distances between objects in the region and the UV in a multiplicity of directions;

the processing unit is configured and operable to:

generate a map based on the scanning output data, the map representing at least a part of the region, and is divided into cells, each cell being classified to a class selected from two or more classes, comprising traversable and non-traversable; receive data indicative of a destination of the UV; and based on the map, execute a planning process for planning one or more paths for the UV, the planning process comprising: upon determining that within a path of the one or more paths the UV is to assume a UV-state: query a data structure, stored in a computer storage device operatively connected to the processing unit, configured to keep one or more entries, each of the entries indicating whether a respective vehicle-state is feasible for the UV, the vehicle-state being associated with at least a respective position and heading of the UV; if the data structure comprises an indication corresponding to the vehicle-state, using data stored in association with the vehicle-state for planning the path, otherwise computing and storing the data associated with the vehicle-state; and selecting a path from the one or more paths.

Using the indication in the data-structure helps to reduce the time required for planning the path for the UV, thus enabling to evaluate a greater number of optional paths within a given period of time. This can assist in increasing speed and smoothness of vehicle maneuverability.

The UV disclosed in accordance with the aspects of the presently disclosed subject matter detailed above can optionally comprise one or more of features (i) to (xvii) listed above, mutatis mutandis, in any technically possible combination or permutation.

According to another aspect of the presently disclosed subject matter there is provided a non-transitory computer readable storage medium retaining a program of instructions, the program of instructions, when read by a computer, cause the computer to perform a method of path planning for an unmanned vehicle (UV), comprising:

obtaining a map based on scanning output data; the scanning output data is a product of scanning operations executed by a scanning device on-board the UV, during which a region within an area traversed by the UV is scanned; the map is divided into cells, each cell is classified to a class selected from two or more classes, comprising traversable and non-traversable;

based on the map, planning two or more paths to a destination of the UV, the planning comprising:

upon determining that within a path of the two or more paths the UV is to assume a vehicle-state: query a data structure configured to maintain information indicating whether a respective vehicle-state is feasible for the UV, the vehicle-state being associated with at least a respective position and heading of the UV; if the data structure comprises an indication corresponding to the vehicle-state, using data stored in association with the vehicle-state for planning the path, otherwise computing and storing the data associated with the vehicle-state; and selecting a path from the two or more paths.

According to another aspect of the presently disclosed subject matter there is provided a method of path planning for an unmanned vehicle (UV) while traversing an area, the method comprising: initializing a data structure configured to keep one or more entries, each of the entries indicating whether a respective vehicle-state is feasible for the UV, the vehicle-state being associated with at least a respective position and heading of the UV; operating a scanning device for executing scanning operations, comprising scanning the area, to thereby generate respective scanning output data; obtaining a map based on the scanning output data, the map representing at least a part of the area, the map comprising a group of cells, each cell in the group of cells representing a location within the area, wherein each cell of the group of cells is classified to a class selected from two or more classes, comprising traversable and non-traversable; receiving data indicative of a destination of the UV; and, based on the map, planning one or more paths to a destination of the UV, the planning comprising: upon determining that within one of the one or more paths, the UV is to assume a vehicle-state: if the data structure comprises an indication corresponding to the vehicle-state, using data stored in association with the vehicle-state for planning the path, otherwise computing and storing the data associated with the vehicle-state; and selecting a path from the one or more paths, whereby using the indication reduces time required for planning the path to enable evaluating more paths in a predetermined period of time, thereby a preferable path can be selected from the one or more paths.

The method and computer program product disclosed in accordance with the aspects of the presently disclosed subject matter detailed above can optionally comprise one or more of features (i) to (xvii) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which:

FIGS. 4A and 4B provide graphical demonstrations of two data structures used for storing data to be reused, in accordance with certain examples of the presently disclosed subject matter.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "determining", "computing", "representing", "comparing", "generating", "assessing", "matching", "updating", "initializing", "obtaining", "planning", or the like, refer to the action(s) and/or process(es) of a computer that manipulate and/or transform data into other data, the data represented as physical, such as electronic, quantities and/or the data representing the physical objects. The term "computer" should be expansively construed to cover any kind of electronic device with data processing capabilities, including, by way of non-limiting example, processing unit 116 disclosed in the present application.

The terms "processing unit", "computer", "processing device", "computer processing device" or the like should be expansively construed to include any kind of electronic device with data processing circuitry, which includes a computer processor as disclosed herein below (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) and is capable of executing various computer instructions (stored for example on a computer memory operatively connected therewith).

The operations in accordance with the teachings herein may be performed by a computer specially constructed for the desired purposes or by a general-purpose computer specially configured for the desired purpose by a computer program stored in a computer readable storage medium.

Figure 1:
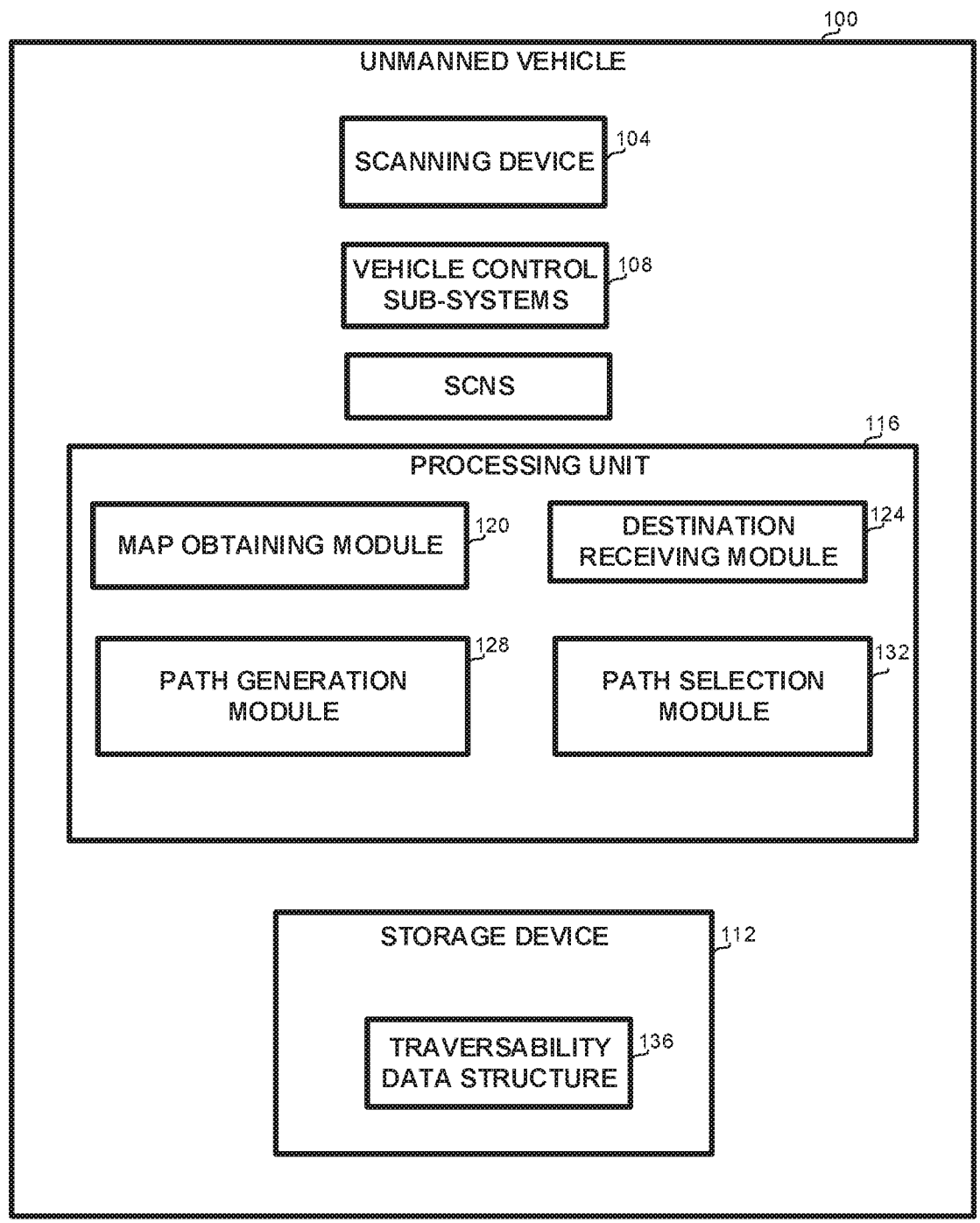
FIG. 1 illustrates a schematic block diagram of an unmanned vehicle with automatic path planning including data re-usage, in accordance with certain examples of the presently disclosed subject matter.

FIG. 1 described below illustrates a general schematic of the system architecture in accordance with an embodiment of the presently disclosed subject matter. Different modules in FIG. 1 can be made up of any combination of software and hardware and/or firmware that performs the functions as defined and explained herein. The modules in FIG. 1 may be centralized in one location or dispersed over more than one device, wherein one or more of the devices can be located on the UGV. In different examples of the presently disclosed subject matter, the system may comprise fewer, more, and/or different modules than those shown in FIG. 1.

Figure 3A:
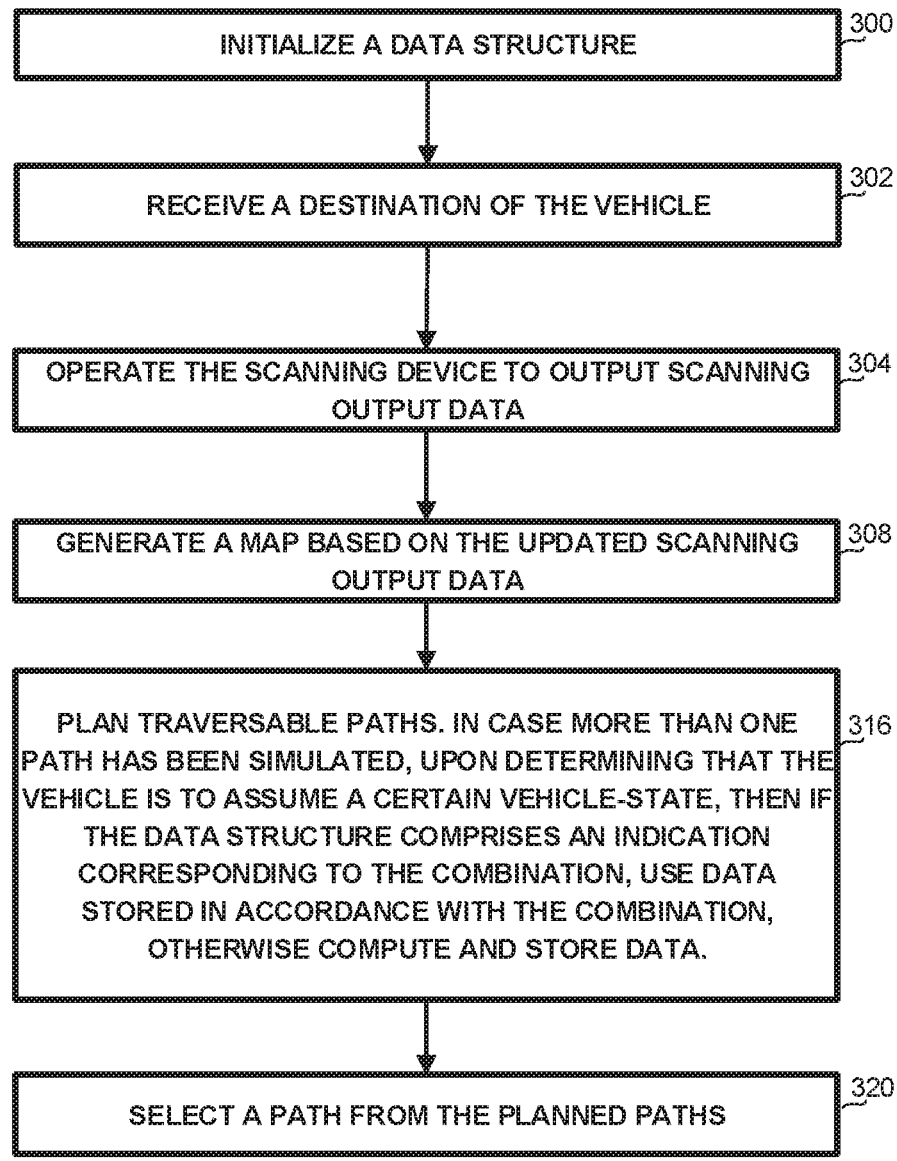
FIG. 3A illustrates a flow-chart of a method for path planning including data re-usage, in accordance with certain examples of the presently disclosed subject matter.
Figure 3B:
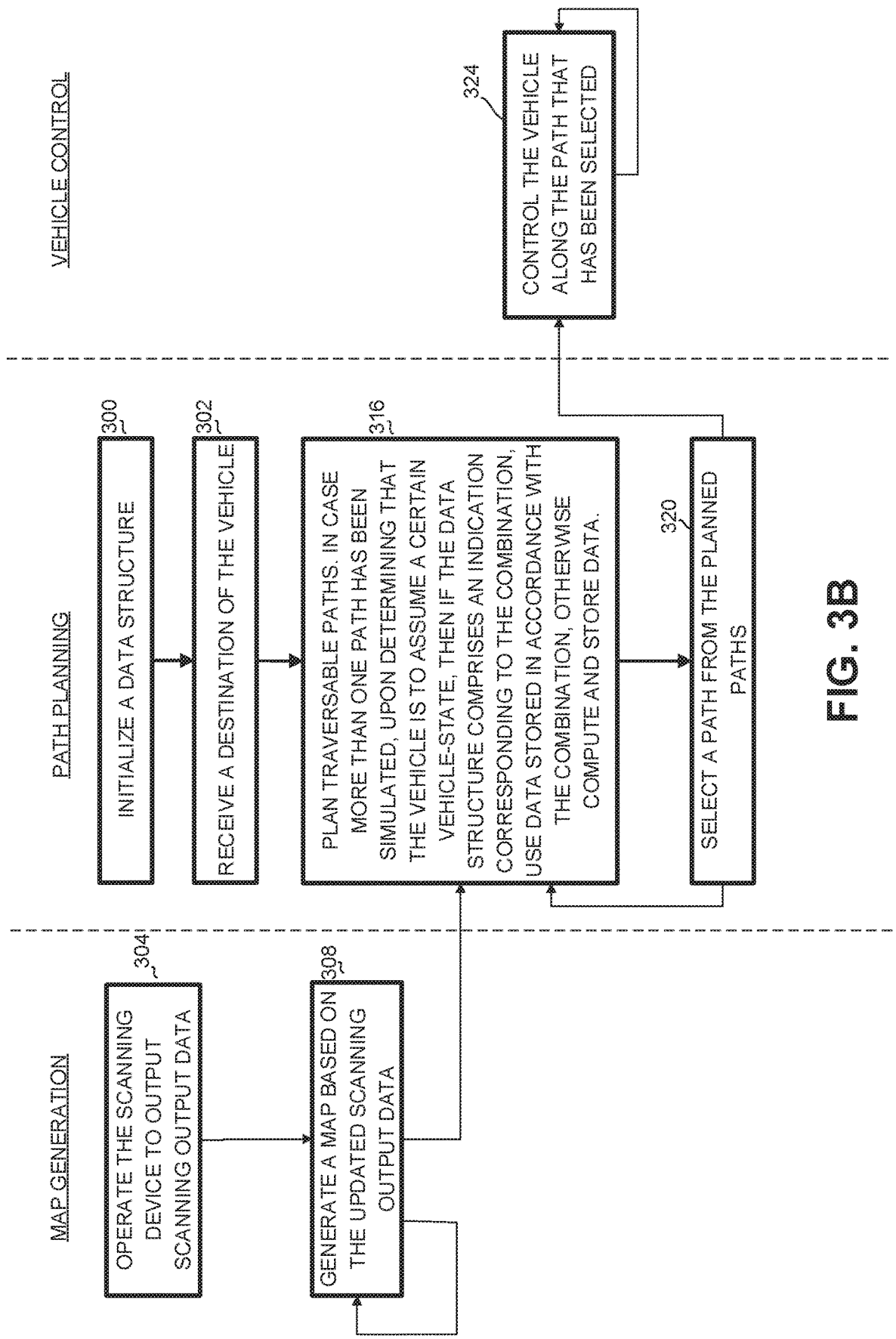
FIG. 3B illustrates another flow-chart of operations carried out during path planning, in accordance with certain examples of the presently disclosed subject matter.

FIGS. 3A and 3B show flowcharts of operations carried out in accordance with examples of the presently disclosed subject matter. In embodiments of the presently disclosed subject matter, fewer, more and/or different stages than those shown in FIGS. 3A and 3B may be executed. Also, operations may be carried in an order different than that illustrated.

The term "scanning device" as used herein should be expansively construed to cover any kind of scanning device adapted to identify that an object is present at a specific distance and at a specific direction relative to the scanning device. Common scanning devices include 3D light detection and ranging (Lidar, also referred to as laser scanning), which relates to controlled steering of laser beams, followed by distance measurement at every pointing direction. Other known technologies include sound navigation and ranging (Sonar) or radio detection and ranging (Radar). A scanning device may output information related to obstacles around the device (360°) or at a partial range, such as 180°.

The term "unmanned vehicle" as used herein should be expansively construed to include, in addition to an autonomously controlled vehicle, a vehicle controlled by a remote operator or an on-board operator who cannot see the environment and steers the vehicle, using, for example, a map of the traversed environment (e.g. 3D or 2.5D map generated in real-time based on scanning output data of a scanning device on-board the vehicle providing a virtual representation of the surrounding environment).

Furthermore, although the description may refer to a ground vehicle, this is by way of non-limiting example only, and other types of vehicles are also contemplated within its scope. These include for example, unmanned aircrafts (e.g. unmanned aerial vehicles also known as unmanned aerial systems or drones) or unmanned marine vehicles (including underwater and above water vehicles), which can likewise comprise a system configured to implement the methods of path planning and autonomous navigation as disclosed herein. As a specific example, a drone flying at low altitude in an area dense with obstacles (e.g. in a forest or an urban area with buildings and other structures) can be configured to execute path planning and navigate according to the principles disclosed herein.

A vehicle in accordance with the description can comprise or carry thereon a scanning device for providing information on objects or obstacles surrounding the vehicle, and a self-contained navigation system (SCNS). The term self-contained navigation system (SCNS) as used herein includes a navigation system that is not dependent on external references in order to determine navigation data such as position, orientation or velocity. This is different for example from GPS navigation that is dependent on information obtained from satellites. In addition to an Inertial Navigation System (INS), other types of self-contained navigation systems include for example, Simultaneous localization and Mapping (SLAM) and odometer navigation systems.

The term "obstacle" as used herein should be expansively construed to cover any kind of object or change in the layout of the environment that prevents a vehicle (e.g. UGV) from passing at the location of the obstacle. Obstacles may include positive obstacles which are generally above the ground, such as trees, buildings, persons, steep ramps or the like, and negative obstacles which are generally below the ground level, for example trenches, ditches, holes, crevasses, or the like.

The term "map" as used herein should be expansively construed to cover any data structure representation of a geographical area. A map may be absolute, i.e., comprise indications of absolute coordinates of an object or a location, or relative, i.e., comprise information about locations or objects, regardless of their locations in absolute coordinates. In some embodiments, a map in accordance with the disclosure may be comprised of cells, for example in the form of a grid, wherein each cell is indicated as non-traversable or traversable, i.e., comprising an obstacle to a vehicle, or not. A map can be a two-dimensional map indicating for each X-Y location whether it is an obstacle or not, a three dimensional map indicating for each X-Y-Z location whether it is an obstacle or not, or a 2.5 dimensional map, indicating for each X-Y location the height of the lowest obstacle above that point, i.e., the clearance height above the point.

A map may have a visual representation on a computerized display device, on paper, or on any other tangible medium.

Reference is now made to FIG. 1, showing a schematic block diagram of a vehicle (e.g. UGV), in accordance with some examples of the disclosure.

Vehicle 100 can comprise or be otherwise operatively connected to a scanning device 104 configured to scan an area surrounding the vehicle, and provide scanning output data for generating a map. A map of a scanned area may be constructed such that it contains an area surrounding vehicle 100, for example centered around vehicle 100.

According to some examples, vehicle 100 can further comprise an SCNS such as an Inertial Navigation System that includes an IMU providing, inter alia, acceleration data of the UGV, and, used for tracking the position, velocity, and orientation of an object. As mentioned above, INS is merely an example, and other self-contained navigation systems can be used in addition to, or instead of INS.

Vehicle 100 can comprise vehicle control sub-systems 108 including for example steering control unit, gear control unit, throttle control unit, etc. Vehicle control sub-systems 108 are configured to receive vehicle control instructions (e.g., steering commands) and control vehicle 100 accordingly. The instructions can be absolute or relative, for example an absolute instruction can be "go 20 meters north", while a relative instruction can be "continue straight for 20 meters" or "throttle 30%, yaw rate 50%".

Vehicle 100 can further comprise or be otherwise operatively connected to computer storage device 112 for storing information such as one or more maps, data structure(s) disclosed below, a destination point, information on obstacles, navigation instructions, binary modules, or the like.

Vehicle 100 can further comprise or be otherwise operatively connected to one or more processing units such as processing unit 116 for controlling and executing various operations, as disclosed herein. Each processing unit comprises a respective processing circuitry comprising at least one computer processor which can be, for example, operatively connected to a computer-readable storage device storing computer instructions to be executed by the computer processor (e.g. computer storage device 112).

According to some examples, different functional elements (units, modules, executables) in vehicle 100 can be implemented as a dedicated processing unit comprising a dedicated computer processor and computer storage for executing specific operations.

Additionally or alternatively, one or more functional elements can be operatively connected to a common processing unit configured to execute operations according to instructions stored in the functional elements. For example, processing unit 116 can comprise one or more computers or processing units, which can be configured to execute several functional modules in accordance with computer-readable instructions stored on a non-transitory computer-readable medium (e.g. storage device 112) operatively connected to a computer processor. For illustrative purposes, such functional modules are referred to hereinafter as comprised in processing unit 116.

In some examples, processing unit 116 can comprise or be otherwise operatively connected to map obtaining module 120. Map obtaining module 120 can be operative in generating a map based on the readings received from scanning device 104, or another source of information. The size of the area represented by the map can be in accordance with the range at which scanning device 104 can scan. In alternative embodiments, map obtaining module 120 can be operable for receiving a map from an external source, for example via a communication channel.

In some examples, processing unit 116 can comprise destination receiving module 124, for receiving, for example from an external source via a communication channel, a location of a destination. In some embodiments, an initial path may be received, for the purpose of serving as a basis for planning the path.

According to some examples, processing unit 116 can comprise path generation module 128, configured for generating one or more paths from a starting point such as a current location, to a destination. The paths can be generated in any required manner for example as described in Israeli Patent Application No. 253769 filed Jul. 31, 2017, which is incorporated herein by reference in its entirety, and particularly as explained in FIG. 3 and exemplified in FIG. 4 and the associated description: page 16 line 18 to page 23 line 25 of application 253769.

As part of planning a path, a vehicle-state evaluation process can be performed, including determining whether a vehicle-state is feasible. Determination as to whether a vehicle-state is feasible or not may be based on, but is not limited to, any one or more of the following: whether the vehicle would collide with an obstacle when in the vehicle-state, and whether one or more of the roll and pitch angles of the vehicle in a vehicle-state are within some predefined threshold values or comply with other predefined criteria. If the vehicle-state is feasible, one or more weights may be assigned to the vehicle-state. For example, the weight can be indicative of a degree of favourability of a certain vehicle-state (e.g. based on proximity to a detected obstacle).

Vehicle-state evaluation may be a computationally intensive process and may accordingly consume significant time and other computational resources. In order to save resources, according to examples of the presently disclosed subject matter, a data structure may be maintained, (e.g., traversability data structure 136 stored in storage device 112) which is used for storing information indicative of whether a specific vehicle-state has been considered. The data structure may further comprise for each such considered vehicle-state, data indicative of whether the vehicle-state is feasible, and its associated weights. When a vehicle-state needs to be examined as part of planning a path, it can be first determined whether the vehicle-state has already been analysed, and if it has, the feasibility results and weights computed for the vehicle-state may be retrieved and used. If the vehicle-state has not been previously checked, it may be checked and the results may be stored for planning further paths. Re-using calculation results may provide for generating more paths in a given period of time as compared to a case where the vehicle-state evaluation process is repeated for the same vehicle-states.

Path selection module 132 is configured to select a most suitable path once two or more paths are available, when the time designated for this purpose has elapsed. It will be appreciated that as the path planning technique disclosed herein provides for reducing the time and other resources required for calculating paths, more paths can be generated during the time allotted for calculating paths, which in turn increases the probability of obtaining a more suitable path.

In some examples of the disclosed subject matter, a rank of a path is computed in accordance with whether each of the different points along the path is feasible, and as a function of the weights associated with each point. The rank can be calculated for example based on one or more of: sum; average; maximal or minimal value of one or more of the weights; etc.

Selection of a path by path selection module 132 can be based for example, on one or more of the following path characteristics: the shortest path, the fastest path, the path having minimal or maximal weights, or in accordance some other suitable criteria.

Figure 2:
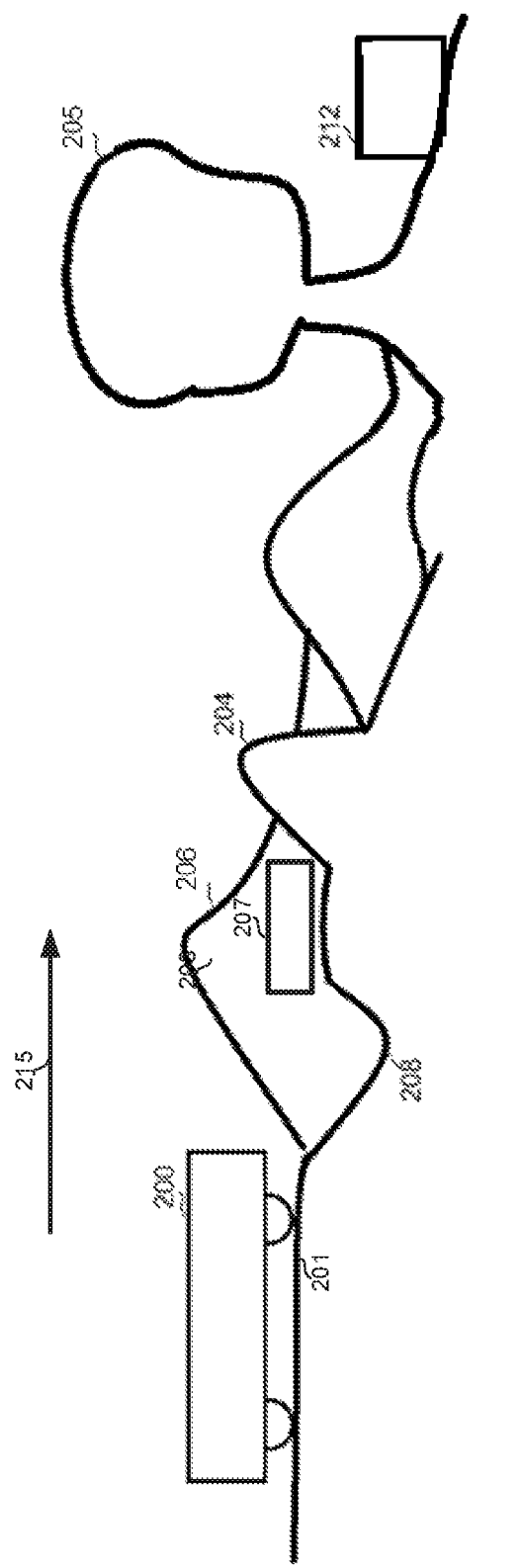
FIG. 2 is a schematic illustration of an environment in which a UGV has to navigate.

Reference is now made to FIG. 2, showing a schematic illustration of an example of an environment in which a vehicle (UGV 200) has to navigate from a current location 201 to destination 212. The environment may comprise obstacles such as building 207, terrain obstacles including positive obstacle 204, which is above ground level and may have a steep slope; negative obstacle 208 which is below ground level; overhead obstacle 205 such as a tree or a bridge, which UGV 200 can pass below some parts of the obstacle; and steep terrain 206 which may be for example a back, side or front slope. All these obstacles are non-traversable for UGV 200 and a path to destination 212 should therefore avoid them. In addition, areas such as slope 203 may be possible, but not recommended for the UGV to traverse. Notably, some objects can present an obstacle when accessed from one side, but not when accessed from another side. For example, a ramp may present an obstacle when accessed from the side, but not when accessed from the front or back. UGV 200 can assume, for example the current position and direction as shown, but cannot assume a location further in the direction of arrow 215, since this will imply a significant slope which may not be allowed for the UGV.

A map of the environment, which depicts the area in a certain resolution, can be generated based on scanning output data received from a scanner (scanning device). One or more paths to a destination point can then be planned according to the map while reusing information as detailed above. A path to be traversed can then be selected from the one or more planned paths.

Reference is now made to FIG. 3A, showing a flowchart of a method for planning a path in an environment with obstacles, and to FIGS. 4A and 4B, showing graphical representation of data structures in accordance with some examples.

According to one example, at block 300, a data structure is initialized, wherein the data structure is configured to store for each one of a multiplicity of vehicle-states (each vehicle-state is defined by certain vehicle navigation parameters that include for example at least a specific position and heading of the UV, an in case of an aerial or submarine vehicle may also include orientation) one or more indications, comprising for example, feasibility flags, and one or more weights.

According to some examples, the data structure can comprise some or all of the following fields for each vehicle-state that has been considered:

A "considered" flag indicating whether the vehicle-state has been considered;

A "possible location" field indicating whether the vehicle can assume the vehicle-state without colliding with an obstacle;

A "possible incline" field indicating whether the vehicle can assume the vehicle-state without its roll or pitch angles exceeding a threshold or otherwise violating a criterion;

In some examples of the disclosed subject matter, the "possible location" and the "possible incline" fields may be combined into a single field.

A "proximity weight" field indicating how close the vehicle is to an obstacle. The "proximity weight" field can store a distance in length units, such as centimeters. In other examples, the proximity of the path to any one or more obstacles can be expressed as an index. This measure may be determined by virtually increasing the size of the vehicle by one or more virtual envelopes, also referred to as "virtual layers", surrounding the vehicle, each having a predetermined width. In an example in which an internal and an external layer are considered, a situation in which the external layer hits an obstacle indicates that the vehicle is at a distance from the obstacle which is between the width of the internal layer and the sum of the widths of the two layers. A planned path in which the internal layer hits an obstacle indicates that the vehicle is at a distance from the obstacle which is at most the width of the internal layer. Thus, in the latter case the vehicle is closer to the obstacle than in the former case. The virtual layers provide for forcing the path to keep the vehicle at least at a predetermined distance from an obstacle, thus ensuring that the vehicle does not come into contact with the obstacle, even in the presence of some planning or navigating error. The proximity of the vehicle to the obstacles may be disretized by using the virtual layer index, for example 1 for the internal layer, and 2 for the external layer, rather than the exact distance between the vehicle and the obstacle.

An "incline weight" field comprising one or more indications of the roll and pitch angles the vehicle assumes at the vehicle-state. This field can be implemented as two fields, indicating the angles. Alternatively, a discretization of the angles may be stored, for example in the range of 1 . . . 5, wherein 1 indicates a small angle, such as 0-2 degrees, and 5 indicates an angle range having an upper bound equal to the maximal allowed angle. Alternatively, the angles may be stored as one field holding a combination of the two values, such as a sum, a maximum, an average or the like.

A "permitted area weight" field indicates to what degree the vehicle is in an area defined as undesirable or restricted when assuming the vehicle-state. For example, a lawn, private property, protected area (e.g. nature reserve), paved roads, sidewalks, or the like. According to one non-limiting example, this weight can be discretized to one of a number of values, such as 1 . . . 5.

FIG. 4A shows a first example of the data structure, comprising table 404 having an entry for each vehicle-state comprising a location, expressed for example in X and Y coordinates with some predefined resolution (e.g. 10 cm), and direction, expressed for example in a resolution of 1 degree. For example, each row in table 404 comprises the above mentioned fields, including whether the vehicle-state has been considered. If the vehicle-state has been considered, the other fields are indicative of whether the location is possible, whether the incline is possible, and the proximity, incline and permitted area weights.

FIG. 4B shows a second exemplary embodiment of the data structure, comprising a hash table. Each entry 408, 412, 416, 420 is associated with a hash value computed using some unique value(s) related to the vehicle-state. For example, the values can be the position and direction vehicle-state, where the respective entry is created upon the vehicle-state being encountered for the first time. Thus, the mere existence of an entry having a value corresponding to the vehicle-state is an indication of the vehicle-state having been considered. Upon the first encounter with a vehicle-state, a hash entry is created, which comprises the relevant fields as disclosed above. Once the relevant values are calculated, they can be stored while being linked (associated) with the relevant hash entry.

It will be appreciated that a table and a hash table are merely two examples of such a data structure, and other types of data structures can likewise be used.

Referring now back to FIG. 3A, in some examples, at block 304 scanning device 104 is operated to scan the environment and output scanning output data.

At block 308, a map may be obtained for example by map obtaining module 120. In some examples, the map is generated by processing unit 116 based on the scanning output data. In other examples, the map is received from another computing platform via a communication channel. The map can be represented for example as a grid, wherein each cell in the grid is classified as non-traversable or traversable, i.e., comprising an obstacle to a UGV or not. An example of a method of map generation is described in PCT Application No. PCT/IL2018/050208 entitled "Method of navigating an unmanned vehicle and system thereof" (see for example FIGS. 3 and 4 in PCT/IL2018/050208), which is incorporated herein by reference in its entirety. In some examples, the data structure is constructed such that the resolution of its entries is the same as the resolution of the map, such that the data structure relates to every location in the map (and in every direction).

In some examples, a destination of the vehicle may be received (block 302), for example via a communication channel, deduced by image analysis or video analysis by searching for a predetermined signal or gesture in a captured image or video, or the like. According to other examples the destination may already be available (e.g. stored on computer storage 112). According to other examples, destination of the vehicle is provided in global coordinates and its position relative to the position of the vehicle is determined based on GPS data received from GPS on-board the vehicle. As explained in detail in PCT PCT/IL2018/050208, the vehicle can be configured to navigate toward its global destination using GPS, while navigating for avoiding obstacles using the SCNS (e.g. INS) and the mapping data, where the path planning is executed as part of the SCNS navigation for avoiding obstacles.

At block 316, paths are being planned (or simulated). As part of the path planning, vehicle-states along the path are determined. As explained in Israeli Patent Application No. 253769 and illustrated in FIG. 5 of Application 253769, a path can be comprised of a plurality of segments. The beginning of each segment starts with a point where vehicle-states are determined. The length of the segments, that corresponds to the frequency of points where vehicle-states are determined, can be selected according to different predefined rules. For example, a segment length of half the UGV size may be selected. In other examples, a segment length of between about 1 meter and about 10 meters may be selected.

Thus, during path planning, different vehicle-states along the path (e.g. at the beginning of each segment), which are defined by a location and direction of the UV, are analyzed using the traversability data-structure. The traversability data-structure is queried and if it comprises an indication corresponding to the vehicle-state, the data stored in accordance with the vehicle-state is used rather than computed. If there is no such indication, then the data is computed and stored for future use.

Figure 5:
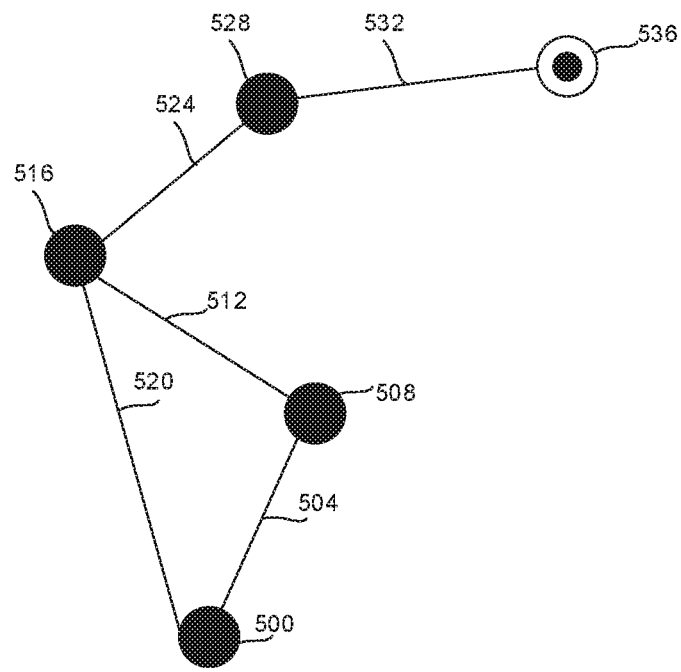
FIG. 5 is an graphic illustration of path planning in which re-usage can be exercised, in accordance with certain examples of the presently disclosed subject matter.

Reference is now made to FIG. 5 showing an example of such re-usage of previously computed data. A path has to be planned from a current location 500 of a UGV to destination 536. One possible path is comprised of segments 504, 512, 524 and 532, and another possible path is comprised of segments 520, 524 and 532.

It will be appreciated that the two paths have segments 524 and 532 in common, such that at location 528 the UGV assumes the same location and the same direction, regardless of whether the UGV is travelling according to the first or the second path. Thus, when a first of the two paths is calculated, the feasibility flags and the weights are computed for a vehicle-state comprising location 528 and the direction at which the UGV arrives at location 528 from segment 524. The computation comprises determining whether the location and the inclination are feasible for the UGV. For example, a location may not be indicated as an obstacle, but an obstacle may be located at a short distance from the location, such that when the UGV is positioned in the location and direction, a part of it overlaps the obstacle or part thereof, which thus makes the location and direction infeasible. In another example, the ground level may be such that the UGV has to assume a roll or pitch angle exceeding a predetermined threshold or otherwise violating some predefined criteria. Evaluation can further comprise determining the incline weight, proximity weight or permitted area weight, or other parameters stored in association with a vehicle-state.

At block 320, a path can be selected from the generated paths (e.g. by path selection module 132). If one path is available, then this path is selected, otherwise selection can be made between the paths, for example, if no point along the path is infeasible, and based on a minimal (or maximal, where greater weights provide a more positive indication) accumulated weight of the points along the path, minimal or maximal weight, average weight, or other criteria.

FIG. 3B is another flowchart of operating carried out in accordance with some examples of the presently disclosed subject matter. FIG. 3B shows the operations divided into three respective asynchronous processes that are executed while the vehicle is advancing through an area. Operations corresponding to those described above with reference to FIG. 3A are assigned the same reference numerals.

A first process is a map generation process. As mentioned above, a map can be generated based on scanning output data obtained by a scanning device located on-board the vehicle. As the vehicle advances, the map is continuously being updated based on new scanning output data of the regions surrounding the vehicle. As described in detail in PCT Application No. PCT/IL2018/050208 (see for example description with respect to FIG. 4 on page 21) the map can be generated around the vehicle such that as the vehicle advances within the area, the map is updated as new regions are being scanned and added to the map, and other regions located in the opposite direction of the vehicle's advancement are excluded from the map.

The updated map is used in the second process—path planning. Information from the updated map is used during generating of paths, the vehicle-state evaluation process and selection of a preferred path as described above with reference to blocks 316 and 320.

In the third process—vehicle control process—the vehicle advances along the path that has been selected. In some examples, the vehicle proceeds by autonomously generating instructions to the various vehicle control sub-systems (108) in order to steer the vehicle along the selected path (block 324).

As the vehicle advances (along the selected path) and new map updates are generated based on new scanning output data, the paths are continuously updated as well. Thus, according to some examples, one or more paths are generated for traversing through a region of the traversed area as depicted in a certain map update and then when the traversed region is changed with the advancement of the vehicle, updated paths are generated/simulated for traversing the new regions.

As mentioned above, the three processes are executed asynchronously. According to one example, a map update can be provided about ten times each second (10 Hz), a path is generated about twice each second (2 Hz), and control commands are generated about twenty times each second (20 Hz). When executing path planning, the most updated available map is used, and when generating control commands, the most updated available path is used.

According to some examples, responsive to updates made to the map, and following respective updates made to the paths, based on the map updates, the traversability data-structure is updated as well. While new paths that comprise new segments are generated and new vehicle-states that belong to new segments are inserted into the traversability data-structure, old vehicle-states that belong to past segments of regions which have been excluded from the map are deleted from the traversability data-structure. This helps to maintain a small traversability data-structure, and thus reduces memory resources, and, in some cases, reduces processing time.

Experimental results performed by the Applicant have shown a reduction 30% or more in the average time required for planning paths when reusing the vehicle-state information. This reduction translates to a gain of 40% or more in the number of paths that can be planned in a certain time period.

It is noted that the teachings of the presently disclosed subject matter are not bound by the steps described with reference to of FIG. 3 and the components described with reference to FIG. 1. Equivalent and/or modified functionality can be consolidated or divided in another manner and can be implemented in any appropriate combination of software, firmware and hardware and executed on a suitable device.

Those skilled in the art will readily appreciate that various modifications and changes can be applied to the embodiments of the invention as hereinbefore described without departing from its scope, defined in and by the appended claims.

The invention claimed is:

1. A method of autonomous path planning for an unmanned vehicle (UV) traversing an area, the method comprising:
   operating a scanning device for executing scanning operations, comprising scanning a region within the area, to thereby generate respective scanning output data;
   generating a map based on the scanning output data, the map representing at least a part of the region;
   based on the map, planning multiple paths for the UV, wherein in each one of the multiple paths the UV is to assume multiple respective vehicle-states, each vehicle-state is characterized by a respective position and heading of the UV;
   the planning comprising:
   evaluating the multiple paths, comprising
   for each path being evaluated, querying a data structure; the data structure is configured to maintain one or more entries, each entry represents a respective vehicle-state and includes data indicative as to whether the respective vehicle-state is feasible for the UV and
   determining if the data structure comprises data corresponding to any one of the respective vehicle-states of the path, and if yes, using data stored in association with the respective vehicle-state for evaluating the path, otherwise computing and storing the data associated with the respective vehicle-state; and
   selecting a preferable path from the multiple paths; wherein using the data structure reduces time required for evaluating the multiple paths and thus enables to evaluate more paths in a certain period.

2. The method of claim 1, wherein planning one or more paths includes planning two or more paths.

3. The method of claim 1, further comprising steering the UV in accordance with the preferable path that has been selected.

4. The method of claim 1, wherein feasibility of the vehicle-state requires one or more of:
   a. position of the UV at the vehicle-state is not mapped to a non-traversable cell, wherein the map is divided into cells, each of the cells is classified to a class selected from at least two classes, comprising traversable and non-traversable; or
   b. yaw and pitch angles of the UV comply with one or more predefined criteria.

5. The method of claim 1, further comprising receiving data indicative of a destination of the UV, and wherein the one or more paths are determined from a current position of the UV to the destination.

6. The method of claim 1, further comprising as the UV advances within the area and new scanning output data of new regions within the area is generated, obtaining an updated map generated and based on the new scanning output data and repeating the planning based on the updated map.

7. The method of claim 6, further comprising as the UV advances within the area and new scanning output data of new regions within the area is generated, excluding old regions from the map; and deleting from the data structure, vehicle-states that correspond to the old regions.

8. The method of claim 1, wherein the data structure comprises one or more entries, each entry representing a respective vehicle-state and comprises an indication as to whether the respective vehicle-state is feasible or not.

9. The method of claim 1, wherein the map is divided into cells, each of the cells is classified to a class selected from at least two classes, comprising traversable and non-traversable.

10. A system mountable on an unmanned vehicle (UV), the system comprising:
    a processing unit configured and operable to:
    receive scanning output data, the scanning output data is a product of scanning operations executed by a scanning device on-board the UV and include scanning a region within a traversed area;
    generate a map based on the scanning output data;
    based on the map, plan multiple paths for the UV, wherein in each one of the multiple paths the UV is to assume multiple respective vehicle-states, each vehicle-state is characterized by a respective position and heading of the UV; the planning comprising:
    for each planned path of the multiple paths:
    query a data structure configured to keep one or more entries, each entry represents a respective vehicle-state and includes data indicative as to whether the respective vehicle-state is feasible for the UV;
    determine if the data structure comprises data corresponding to any one of the respective vehicle-states of the path, and if yes, use data stored in association with the respective vehicle-state for planning the path, otherwise compute and store the data associated with the respective vehicle-state; and
    select a preferable path from the multiple paths, wherein using the data structure reduces time required for evaluating the multiple paths and thus enables to evaluate more paths in a certain period.

11. The system of claim 10, wherein the processing unit is further configured to generate steering commands for steering the UV in accordance with the path.

12. The system of claim 10, wherein feasibility of the vehicle-state requires one or more of:
   a. that yaw and pitch angles of the UV when the UV assumes the vehicle-state comply with one or more predefined criteria; or
   b. position of the UV when assuming the vehicle-state is not mapped to a non-traversable cell, wherein the map is divided into cells, each of the cells is classified to a class selected from at least two classes, comprising traversable and non-traversable.

13. The system of claim 10, wherein the data structure comprises one or more entries, each entry representing a respective vehicle-state and comprises an indication as to whether the respective vehicle-state is feasible or not.

14. The system of claim 13, wherein the one or more entries further comprises a weight indicating proximity of the UV to an obstacle when the UV assumes the vehicle-state.

15. The system of claim 10, wherein one or more entries further comprises a weight indicating the UV having presence at an undesired location, when the UV assumes the vehicle-state.

16. The system of claim 10, wherein the processing unit is further configured and operable to generate the map in real-time based on the scanning output data.

17. The system of claim 10, wherein the processing unit is further configured and operable to receive data indicative of a destination of the UV, and wherein the one or more paths are determined from a current position of the UV to the destination.

18. The system of claim 10, wherein, as the UV advances within the area and new scanning output data of new regions within the area is generated, the processing unit is further configured and operable to obtain an updated map generated based on the new scanning output data and repeat the planning based on the updated map.

19. The system of claim 18, wherein, as the UV advances within the area and new scanning output data of new regions within the area is generated, the processing unit is further configured to exclude old regions from the map; and delete from the data structure vehicle-states that correspond to the old regions.

20. An unmanned vehicle (UV), comprising:
   a scanning device; and
   a processing unit comprising one or more processing circuitries;
   wherein the scanning device is configured and operable to scan a region surrounding the UV within an area traversed by the UV to thereby provide scanning output data providing information about distances between objects in the region and the UV in a multiplicity of directions; the UV further comprising a system according to claim 10.

21. The UV of claim 20 is any one of:
   a. an unmanned ground vehicle;
   b. an unmanned aerial vehicle; or
   c. an unmanned marine vehicle.

22. The system of claim 10, wherein the map is divided into cells, each of the cells is classified to a class selected from at least two classes, comprising traversable and non-traversable.

23. A non-transitory computer readable storage medium retaining a program of instructions, the program of instructions when read by a computer, cause the computer to perform a method of autonomous path planning for an unmanned vehicle (UV), the method comprising:
   obtaining a map generated based on scanning output data, the scanning output data is a product of scanning operations executed by a scanning device on-board the UV, during which a region within an area traversed by the UV is scanned; and
   based on the map, planning multiple paths for the UV, wherein in each one of the multiple paths the UV is to assume multiple respective vehicle-states, each vehicle-state is characterized by a respective position and heading of the UV;
   the planning comprising:
      evaluating the multiple paths, comprising for each path being evaluated, querying a data structure; the data structure is configured to maintain one or more entries, each entry represents a respective vehicle-state and includes data indicative as to whether the respective vehicle-state is feasible for the UV and
      determining if the data structure comprises data corresponding to any one of the respective vehicle-states of the path, and if yes, using data stored in association with the respective vehicle-state for planning the path, otherwise computing and storing the data associated with the respective vehicle-state; and
      selecting a preferable path from the multiple paths; wherein using the data structure reduces time required for evaluating the multiple paths and thus enables to evaluate more paths in a certain period.

24. The non-transitory computer readable storage medium of claim 23, wherein the map is divided into cells, each of the cells is classified to a class selected from at least two classes, comprising traversable and non-traversable.

* * * * *